United States Patent
Lin et al.

(10) Patent No.: US 11,733,378 B2
(45) Date of Patent: Aug. 22, 2023

(54) DETECTION SYSTEM AND DETECTION METHOD FOR IN-EAR EARPHONE

(71) Applicant: Compal Electronics, Inc., Taipei (TW)

(72) Inventors: Chung-Han Lin, Taipei (TW); Yueh-Hsiang Chen, Taipei (TW); Kun-Chi Pan, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 72 days.

(21) Appl. No.: 17/669,751

(22) Filed: Feb. 11, 2022

(65) Prior Publication Data

US 2023/0176211 A1 Jun. 8, 2023

(30) Foreign Application Priority Data

Dec. 8, 2021 (TW) .................................. 110145935

(51) Int. Cl.
*H04R 25/00* (2006.01)
*G01S 15/34* (2006.01)
*G06F 3/16* (2006.01)
*H04R 1/10* (2006.01)

(52) U.S. Cl.
CPC ............... *G01S 15/34* (2013.01); *G06F 3/16* (2013.01); *H04R 1/1041* (2013.01); *H04R 1/1091* (2013.01); *H04R 1/1016* (2013.01); *H04R 2460/13* (2013.01)

(58) Field of Classification Search
CPC .......... H04R 3/04; H04R 1/326; H04R 3/005; H04R 3/02; H04R 29/006; H04R 2410/07
See application file for complete search history.

(56) References Cited

U.S. PATENT DOCUMENTS

| | | |
|---|---|---|
| 10,867,019 B2 | 12/2020 | Yano et al. |
| 10,878,825 B2 | 12/2020 | Lesso |
| 10,905,337 B2 | 2/2021 | Tran |
| 10,915,614 B2 | 2/2021 | Lesso |
| 2016/0150335 A1 | 5/2016 | Qutub et al. |

(Continued)

FOREIGN PATENT DOCUMENTS

| | | |
|---|---|---|
| CN | 106982403 A | 7/2017 |
| CN | 111988692 A | 11/2020 |

(Continued)

*Primary Examiner* — Amir H Etesam
(74) *Attorney, Agent, or Firm* — Kirton McConkie; Evan R. Witt (57) ABSTRACT

The present disclosure provides a detection system and a detection method. The microphone of the detection system receives the response signal formed according to the shape of the sealed cavity. The conversion unit transfers the response signal in the time domain to the frequency domain signal in the frequency domain. The calculation unit obtains every frequency value corresponding to the frequency gradient being zero of each frequency waveform which is chosen of the response signal. The average unit averages every frequency value corresponding to the frequency gradient being zero of each chosen frequency waveform into the average frequency value and outputs an average frequency value. The determination unit determines whether the average frequency value is located in the corresponding frequency tolerance range, so that the wearing status of the in-ear earphone is confirmed.

17 Claims, 5 Drawing Sheets

(56) References Cited

U.S. PATENT DOCUMENTS

2020/0187795 A1    6/2020  Yokoi et al.
2020/0374617 A1    11/2020 Liu et al.
2022/0295183 A1*   9/2022  Chen .................... H04R 1/1041

FOREIGN PATENT DOCUMENTS

CN    113115148 A    7/2021
WO    2018019043 A1  2/2018

* cited by examiner

DETECTION SYSTEM AND DETECTION METHOD FOR IN-EAR EARPHONE

CROSS-REFERENCE TO RELATED APPLICATION

This application claims priority to Taiwan Patent Application No. 110145935 filed on Dec. 8, 2021, the entire contents of which are incorporated herein by reference for all purposes.

FIELD OF THE INVENTION

The present disclosure relates to a detection system and a detection method, and more particularly to a detection system and a detection method for an in-ear earphone.

BACKGROUND OF THE INVENTION

At present, the earphones are divided into two kinds according to the wearing mode, such as over-ear earphone and in-ear earphone. The over-ear earphone covers the ear of the user and is not easy to fall off the ear of the user. Consequently, the over-ear earphone doesn't need to detect the wearing status of the user. The in-ear earphone is worn in the ear of the user and may fall off or move when the in-ear earphone is worn for a long time. Consequently, the conventional in-ear earphone not only includes a feedback microphone for receiving sound, but also includes a bone conduction microphone additionally for detecting the wearing status of the user.

The working principle of the bone conduction microphone of the in-ear earphone is described as follows. The sound outputted by the in-ear earphone causes vibrations in the ear canal when the sound is transmitted, and the bone conduction microphone detects the vibrations in the ear canal and proceeds with the piezoelectric conversion according to the detection result. Consequently, a sound signal is produced. Moreover, the bone conduction microphone further analyzes the sound signal to determine the wearing status of the in-ear earphone worn by the user. However, when the in-ear earphone is not fitted well, the energy of the vibrations in the ear canal detected by the bone conduction microphone may be insufficient to support the piezoelectric conversion. Consequently, the bone conduction microphone cannot detect the wearing status of the in-ear earphone worn by the user continuously, so that the efficacy of the in-ear earphone cannot continue to be maintained at the optimal status.

Therefore, there is a need of providing a detection system and a detection method for an in-ear earphone in order to address the above issues encountered by the prior arts.

SUMMARY OF THE INVENTION

The present disclosure provides a detection system and a detection method. By employing the detection system and the detection method of the present disclosure, the efficacy of the in-ear earphone is enhanced.

In accordance with an aspect of the present disclosure, a detection system is provided. The detection system is applied to an in-ear earphone. The in-ear earphone is worn in an ear canal of a user. A space between the in-ear earphone and the ear canal is closed and forms a sealed cavity. The detection system includes a sound unit, a microphone and a processor. The sound unit transmits a preset sound signal to the sealed cavity, so that a response signal is fed back from the sealed cavity. The microphone is configured to receive the response signal. The processor includes a conversion unit, a first operation unit, a determination unit and an analysis unit. The conversion unit is electrically connected with the microphone and configured to receive the response signal and transfer the response signal to a frequency domain signal. The frequency domain signal includes a plurality of frequency waveforms. The first operation unit is electrically connected with the conversion unit and configured to receive the frequency domain signal. At least one of the plurality of frequency waveforms of the frequency domain signal located in a frequency interval is chosen by the first operation unit. Every frequency value corresponding to a frequency gradient being zero of each of the plurality of frequency waveforms which is chosen is calculated and averaged by the first operation unit. The first operation unit outputs an average frequency value corresponding to each of the plurality of frequency waveforms which is chosen. The determination unit is electrically connected with the first operation unit and configured to receive a plurality of frequency tolerance ranges and the average frequency value corresponding to each of the plurality of frequency waveforms which is chosen. The determination unit determines whether the average frequency value corresponding to each of the plurality of frequency waveforms which is chosen is located in corresponding one of the plurality of frequency tolerance ranges and outputs a first determination signal. The analysis unit is electrically connected with the determination unit and analyzes a wearing status of the in-ear earphone according to the first determination signal.

In accordance with an aspect of the present disclosure, a detection method for a detection system of an in-ear earphone is provided. The in-ear earphone is worn in an ear canal of a user. A space between the in-ear earphone and the ear canal is closed and forms a sealed cavity. The detection method includes the following steps. Firstly, a preset sound signal is provided. The preset sound signal is transmitted to the sealed cavity and a response signal is fed back through the sealed cavity. Then, the response signal is transferred to a frequency domain signal. The frequency domain signal includes a plurality of frequency waveforms. Then, at least one of the plurality of frequency waveforms located in a frequency interval is chosen. Every frequency value corresponding to a frequency gradient being zero of each of the plurality of frequency waveforms which is chosen is calculated and averaged. An average frequency value corresponding to each of the plurality of frequency waveforms which is chosen is outputted. Then, according to a plurality of frequency tolerance ranges and the average frequency value corresponding to each of the plurality of frequency waveforms which is chosen, it is determined whether the average frequency value corresponding to each of the plurality of frequency waveforms which is chosen is located in corresponding one of plurality of frequency tolerance ranges. A first determination signal is outputted. Then, a wearing status of the in-ear earphone is analyzed according to the first determination signal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
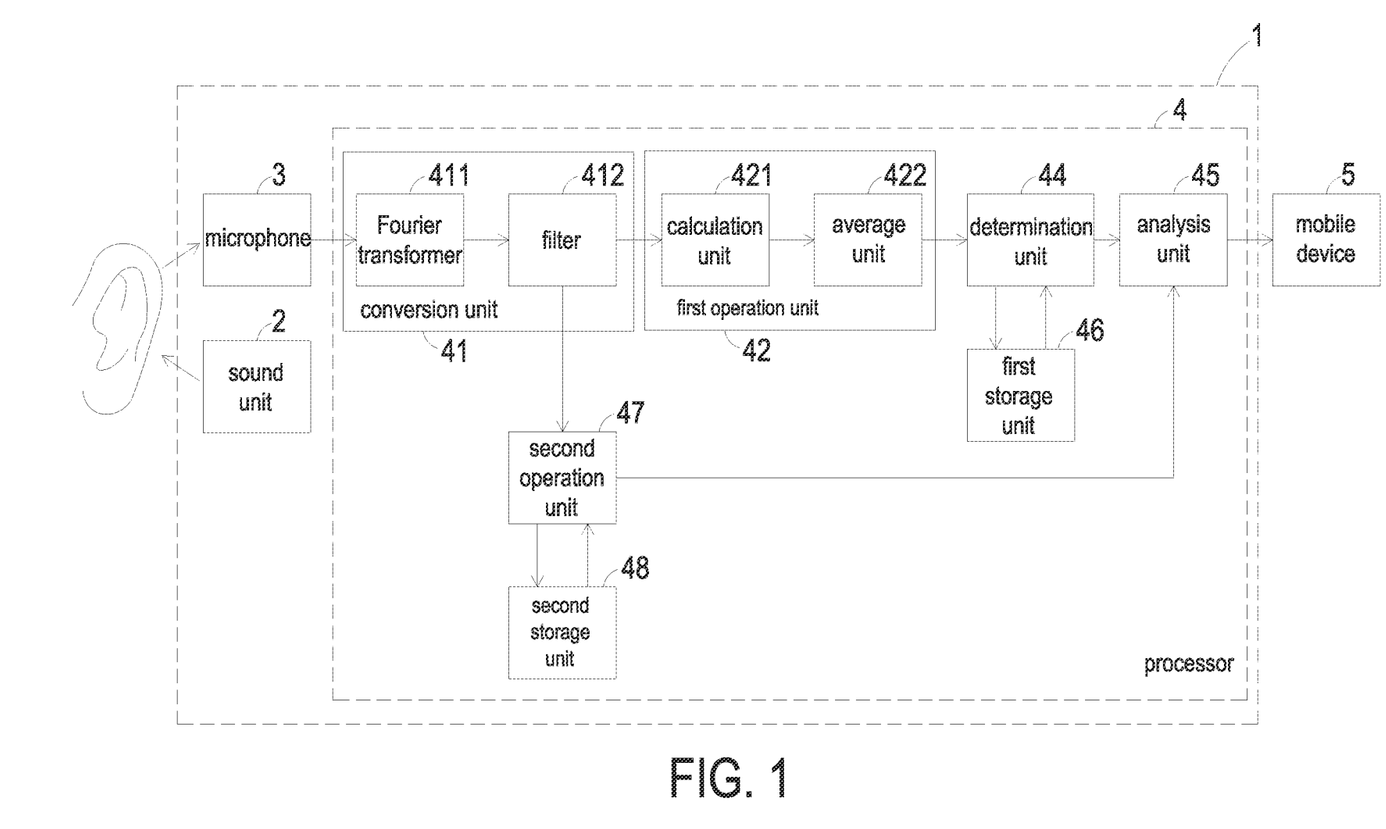
FIG. 1 is a schematic perspective view illustrating a detection system according to an embodiment of the present disclosure.
Figure 2:
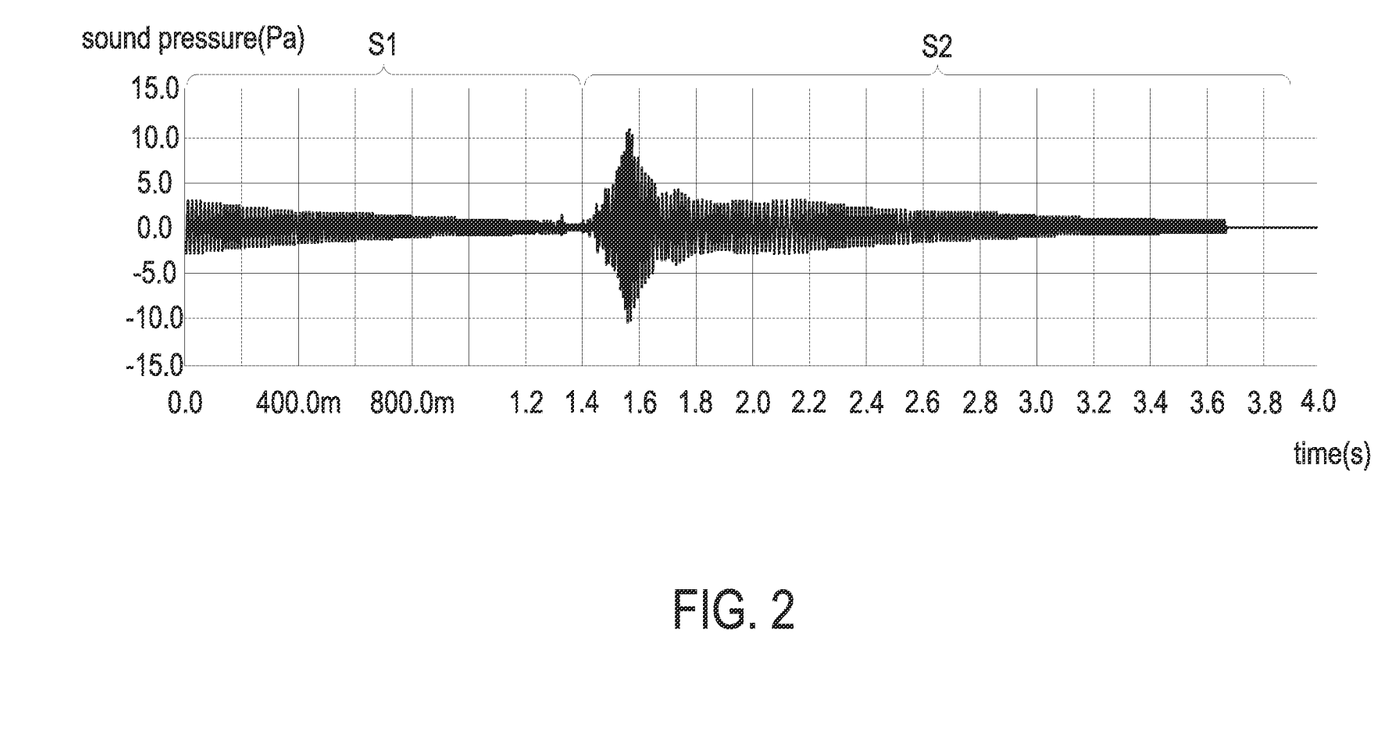
FIG. 2 is a signal waveform diagram illustrating a preset sound signal and a response signal of a sound unit of the detection system of FIG. 1.

FIG. 1 is a schematic perspective view illustrating a detection system according to an embodiment of the present disclosure. FIG. 2 is a signal waveform diagram illustrating a preset sound signal and a response signal of a sound unit of the detection system of FIG. 1. As shown in FIGS. 1 and 2, the detection system 1 of the present disclosure is applied to an in-ear earphone (not shown). The in-ear earphone is worn in the ear canal of the user. When the in-ear earphone is worn in the ear canal of the user, the space between the in-ear earphone and the ear canal is closed and formed a sealed cavity. The detection system 1 transmits signals to and receives signals from a mobile device 5 by means of wireless transmission. The detection system 1 includes a sound unit 2, a microphone 3 and a processor 4. The sound unit 2 is adjacent to the ear canal when the in-ear earphone is worn in the ear canal of the user, and transmits a preset sound signal S1 to the sealed cavity. The preset sound signal S1 is shown in FIG. 2. The preset sound signal S1 passes through the sealed cavity formed between the in-ear earphone and the ear canal, so that a resonance is produced. Different response signal S2 (as shown in FIG. 2) is fed back from the sealed cavity according to different shape of the sealed cavity. The preset sound signal S1 and the response signal S2 are the time domain signals, respectively. As shown in FIG. 2, the X axis is served as a time axis, and the unit of the X axis is second (s). The Y axis is served as a sound pressure axis, and the unit of the Y axis is Pa. It is noted that the shape of the sealed cavity formed between the in-ear earphone and the ear canal is changed due to the different shape of the ear canal of different user or the different wearing position of the in-ear earphone worn in the ear canal of the user. Consequently, the response signal S2 has different signal waveform according to the different shape of the sealed cavity.

The microphone 3 is adjacent to the ear canal when the in-ear earphone is worn in the ear canal by the user, and the microphone 3 receives the response signal S2 passing through and formed by the sealed cavity. The processor 4 is electrically connected with the microphone 3 and includes a conversion unit 41, a first operation unit 42, a determination unit 44 and an analysis unit 45.

Figure 3:
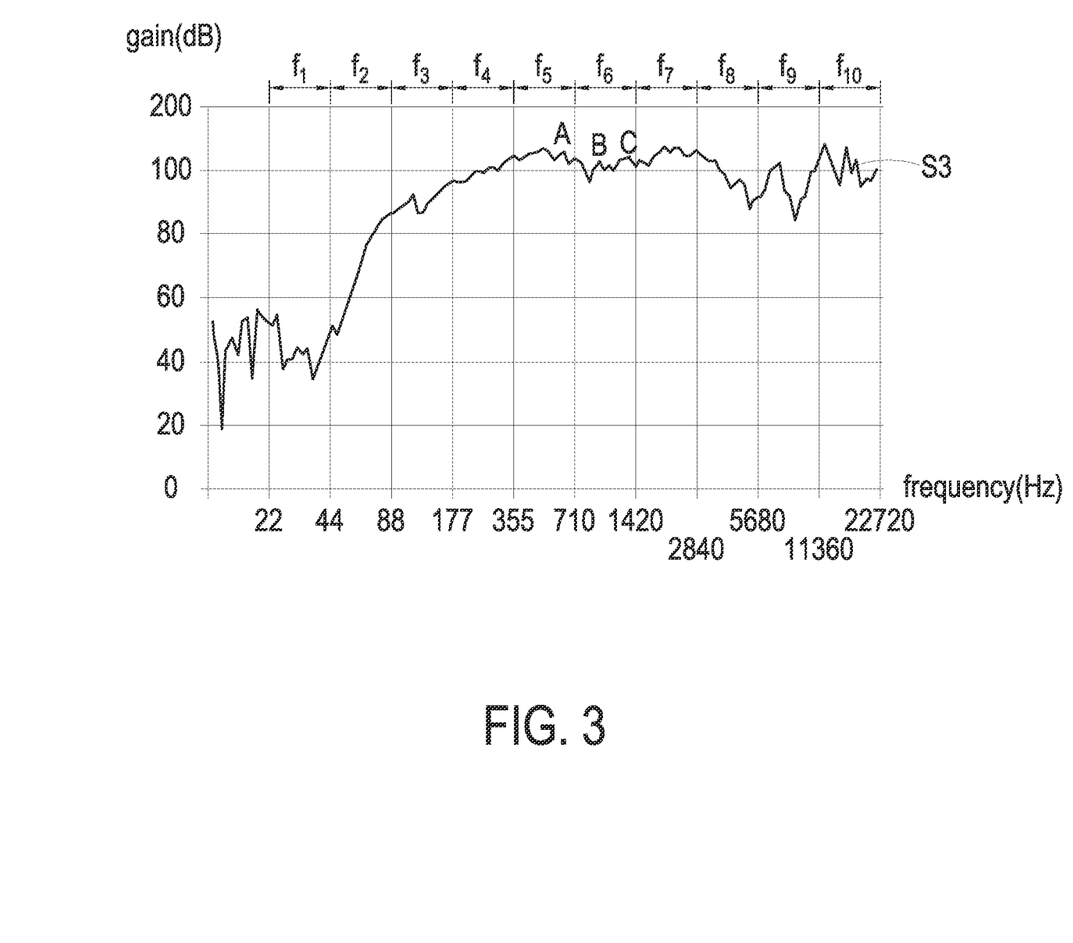
FIG. 3 is a signal waveform diagram illustrating a frequency domain produced by a Fourier transformer of the detection system of FIG. 1.

The conversion unit 41 receives the response signal S2 through the microphone 3. The response signal S2 is in the time domain. For processing the signal easily, the conversion unit 41 includes a Fourier transformer 411 electrically connected with the microphone 3. The Fourier transformer 411 receives the response signal S2 through the microphone 3 and transfers the response signal S2 in the time domain to a frequency domain signal S3 in the frequency domain, as shown in FIG. 3. FIG. 3 is a signal waveform diagram illustrating a frequency domain signal produced by a Fourier transformer of the detection system of FIG. 1. The X axis of FIG. 3 is served as a frequency axis, and the unit of the X axis is Hz. The Y axis of FIG. 3 is served as a gain axis, and the unit of the Y axis is dB. Moreover, the practical signal waveform of the frequency domain signal S3 probably has discontinuous signal portion because of the exterior noise, so that the detection system 1 may be unstable when the signal is processed. For filtering out the discontinuous signal portion, in this embodiment, the conversion unit 41 further includes a filter 412. Preferably but not exclusively, the filter 412 is an octave band filter and is electrically connected with the Fourier transformer 411. The filter 412 filters out the discontinuous signal portion of the frequency domain signal S3, so that the frequency domain signal S3 is smooth. The frequency domain signal S3 filtered by the filter 412 includes a plurality of frequency waveforms. Each of the plurality of frequency waveforms has a center frequency value.

Please refer to table 1, FIGS. 1 and 3. Table 1 is a numerical value table illustrating the plurality of frequency waveforms and the center frequency values of the frequency domain signal S3. As shown in table 1, in the embodiment, the frequency domain signal S3 includes ten frequency waveforms, i.e., a first frequency waveform f1, a second frequency waveform f2, a third frequency waveform f3, a fourth frequency waveform f4, a fifth frequency waveform f5, a sixth frequency waveform f6, a seventh frequency waveform f7, an eighth frequency waveform f8, a ninth frequency waveform f9 and a tenth frequency waveform f10. The frequency value of the first frequency waveform f1 is located between 22 Hz and 44 Hz, and the center frequency value of the first frequency waveform f1 is 31.5 Hz. The frequency value of the second frequency waveform f2 is located between 44 Hz and 88 Hz, and the center frequency value of the second frequency waveform f2 is 63 Hz. The frequency value of the third frequency waveform f3 is located between 88 Hz and 177 Hz, and the center frequency value of the third frequency waveform f3 is 125 Hz. The frequency value of the fourth frequency waveform f4 is located between 177 Hz and 355 Hz, and the center frequency value of the fourth frequency waveform f4 is 250 Hz. The frequency value of the fifth frequency waveform f5 is located between 355 Hz and 710 Hz, and the center frequency value of the fifth frequency waveform f5 is 500 Hz. The frequency value of the sixth frequency waveform f6 is located between 710 Hz and 1420 Hz, and the center frequency value of the sixth frequency waveform f6 is 1000 Hz. The frequency value of the seventh frequency waveform f7 is located between 1420 Hz and 2840 Hz, and the center frequency value of the seventh frequency waveform f7 is 2000 Hz. The frequency value of the eighth frequency waveform f8 is located between 2840 Hz and 5680 Hz, and the center frequency value of the eighth frequency waveform f8 is 4000 Hz. The frequency value of the ninth frequency waveform f9 is located between 5680 Hz and 11360 Hz, and the center frequency value of the ninth frequency waveform f9 is 8000 Hz. The frequency value of the tenth frequency waveform f10 is located between 11360 Hz and 22720 Hz, and the center frequency value of the tenth frequency waveform f10 is 16000 Hz.

Table 1 is a numerical value table illustrating the plurality of frequency waveforms and the center frequency values of the frequency domain signal.

| frequency waveform | frequency (Hz) | center frequency value (Hz) |
|---|---|---|
| first frequency waveform f1 | 22~44 | 31.5 |
| second frequency waveform f2 | 44~88 | 63 |
| third frequency waveform f3 | 88~177 | 125 |
| fourth frequency waveform f4 | 177~355 | 250 |
| fifth frequency waveform f5 | 355~710 | 500 |
| sixth frequency waveform f6 | 710~1420 | 1000 |
| seventh frequency waveform f7 | 1420~2840 | 2000 |
| eighth frequency waveform f8 | 2840~5680 | 4000 |
| ninth frequency waveform f9 | 5680~11360 | 8000 |
| tenth frequency waveform f10 | 11360~22720 | 16000 |

The first operation unit 42 is electrically connected with the filter 412 of the conversion unit 41 and includes a calculation unit 421 and an average unit 422. The calculation unit 421 is electrically connected with the filter 412 of the conversion unit 41 and receives the frequency domain signal S3 filtered by the filter 412. The calculation unit 421 includes a frequency interval which is preset in the calculation unit 421. The frequency interval is located between a frequency upper limit value and a frequency lower limit value. For example, the frequency interval is located between 500 Hz and 8000 Hz, the frequency upper limit value is 500 Hz and the frequency lower limit value is 8000 Hz. The calculation unit 421 chooses at least one frequency waveform, which is located in the frequency interval, from the plurality of frequency waveforms of the frequency domain signal S3. For example, the calculation unit 421 chooses at least one frequency waveform having the center frequency value located in the frequency interval. That is, the calculation unit 421 chooses at least one frequency waveform from the plurality of frequency waveforms of the frequency domain signal S3 and each chosen frequency waveform has the center frequency value located between the frequency upper limit value and the frequency lower limit value. Consequently, the frequency waveforms having higher frequency values and lower frequency values are removed, and the whole value determination is not influenced by the extreme values. The number of the frequency waveform chosen by the calculation unit 421 each time is fixed. In this embodiment, the calculation unit 421 removes the frequency waveform that has the center frequency value greater than 8000 Hz or less than 500 Hz. The calculation unit 421 only chooses the frequency waveform that has the center frequency value located between 500 Hz and 8000 Hz, i.e., the frequency waveforms from the fifth frequency waveform f5 to the ninth frequency waveform f9. Each frequency value of each frequency waveform which is chosen has a frequency gradient correspondingly. Namely, each frequency value of the chosen frequency waveforms from the fifth frequency waveform f5 to the ninth frequency waveform f9 has a frequency gradient correspondingly. In this embodiment, the frequency gradient corresponding to each frequency value of each frequency waveform which is chosen is defined as a tangent slope between the gain and the frequency value. As shown in FIG. 3, the point A is located at the fifth frequency waveform which is chosen, the frequency value of the point A is 500 Hz, and the corresponding frequency gradient is defined as the tangent slope between the gain (i.e., 105 dB) and the frequency value (i.e., 500 Hz). The point A in FIG. 3 is located at the peak of the waveform, so that the frequency gradient (i.e., the tangent slope) is 0 correspondingly. The frequency domain signal S3 has different signal waveform according to different shape of the sealed cavity, so that every frequency value of each frequency waveform which is chosen has different frequency gradient correspondingly according to the different signal waveform caused by different shape of the sealed cavity. Namely, every frequency value of the frequency waveforms from the fifth frequency waveform f5 to the ninth frequency waveform f9 has different frequency gradient correspondingly according to the different signal waveform caused by different shape of the sealed cavity. Moreover, the frequency value corresponding to the frequency gradient being zero of each frequency waveform chosen from the frequency domain signal S3 is not fixed probably. The calculation unit 421 obtains every frequency value corresponding to the frequency gradient being zero of each frequency waveform which is chosen.

The average unit 422 is electrically connected with the calculation unit 421. The average unit 422 averages every frequency value corresponding to the frequency gradient being zero of each frequency waveform which is chosen (i.e., the frequency waveforms from the fifth frequency waveform f5 to the ninth frequency waveform f9) into an average frequency value, and outputs the average frequency value of each frequency waveform which is chosen.

The determination unit 44 is electrically connected with the average unit 422 and receives a frequency tolerance range information. The frequency tolerance range information defines a plurality of frequency tolerance ranges. Preferably but not exclusively, the number of the frequency tolerance ranges is equal to the number of the frequency waveforms which are chosen. In this embodiment, the number of the frequency tolerance ranges is equal to 5 (i.e., the number of the frequency waveforms from the fifth frequency waveform f5 to the ninth frequency waveform f9). Each frequency tolerance range is corresponding to one of the frequency waveforms which are chosen. The determination unit 44 receives the average frequency value corresponding to each frequency waveform which is chosen and set by the average unit 422, and determines whether the average frequency value of each frequency waveform which is chosen is located in the corresponding frequency tolerance range. The determination unit 44 outputs a first determination signal according to the determination result accordingly. For example, when the determination result indicates that the average frequency value of every frequency waveform which is chosen is located in the corresponding frequency tolerance range respectively, the first determination signal is served as a first voltage level. When the determination result indicates that the average frequency value of any frequency waveform which is chosen is not located in the corresponding frequency tolerance range, the first determination signal is served as a second voltage level.

The analysis unit 45 is electrically connected with the determination unit 44, and transmits signals to and receives signals from the mobile device 5 by means of wireless transmission. The analysis unit 45 receives the first determination signal outputted from the determination unit 44 and analyzes the wearing status of the in-ear earphone according to the first determination signal. Consequently, the analysis information of the wearing status of the in-ear earphone worn by the user is transmitted to the mobile device 5 by means of wireless transmission. For example, when the first determination signal is served as the first voltage level (i.e., the average frequency value of every frequency waveform which is chosen is located in the corresponding frequency tolerance range respectively), the analysis unit 45 analyzes that the wearing status of the in-ear earphone is normal. That indicates the same user wears the in-ear earphone and the wearing status of the in-ear earphone worn by the user is correct. When the first determination signal is served as the second voltage level (i.e., the average frequency value of any frequency waveform which is chosen is not located in the corresponding frequency tolerance range), the analysis unit 45 analyzes that the wearing status of the in-ear earphone is abnormal. That indicates the different user wears the in-ear earphone or the same user wears the in-ear earphone in incorrect wearing status. The mobile device 5 determines the wearing status of the in-ear earphone according to the analysis information provided by the analysis unit 45, so that the user determines the wearing status of the in-ear earphone according to the mobile device 5 and adjusts the in-ear earphone on demand.

From above, the microphone 3 of the detection system 1 of the present disclosure receives the response signal S2, which is formed according to the shape of the sealed cavity. The conversion unit 41 transfers the response signal S2 in the time domain to the frequency domain signal S3 in the frequency domain. The calculation unit 421 obtains every frequency value corresponding to the frequency gradient being zero of each chosen frequency waveform of the response signal S2. The average unit 422 averages every frequency value corresponding to the frequency gradient being zero of each chosen frequency waveform into the average frequency value. The determination unit 44 determines whether the average frequency value is located in the corresponding frequency tolerance range, so that the wearing status of the in-ear earphone is confirmed. The conventional in-ear earphone determines the wearing status of the in-ear earphone worn by the user according to the vibrations in the ear canal caused by the bone conduction microphone. Compared to the conventional in-ear earphone, the detection system 1 of the present disclosure applied to the in-ear earphone utilizes the characteristics of the different response signals S2 produced by the ear canals of the different users and analyzes the response signals S2, so that the wearing status of the in-ear earphone is detected efficiently. Even in case that the in-ear earphone is worn for a long time, the detection system 1 of the present disclosure detects the wearing status of the in-ear earphone worn by the user continuously. The efficacy of the detection system 1 of the present disclosure applied to the in-ear earphone is maintained at optimal status continuously. Moreover, the detection system 1 of the present disclosure determines whether the in-ear earphone is used by the same user at the same time.

In this embodiment, when the in-ear phone is worn in the first time by the user, the detection system 1 needs to record the information of the ear canal of the user first. Consequently, when the in-ear earphone is worn by the user again, the detection system 1 can determine whether the in-ear earphone is worn correctly or whether the in-ear earphone is worn by the same user. For recording the information of the ear canal of the user, the processor 4 of the detection system 1 further includes a first storage unit 46 electrically connected with the determination unit 44. When the in-ear phone is worn in the first time by the user, the determination unit 44 receives the average frequency value corresponding to each chosen frequency waveform and set by the average unit 422, and the determination unit 44 sets the frequency tolerance range used by the determination unit 44 according to the average frequency value corresponding to each frequency waveform which is chosen, and stores the frequency tolerance range information in the first storage unit 46.

When the in-ear earphone is worn in not first time by the user, the first storage unit 46 transmits the frequency tolerance range information to the determination unit 44, so that the determination unit 44 receives the frequency tolerance range information and determines whether the average frequency value corresponding to the frequency waveform which is chosen is located in the corresponding frequency tolerance range, and outputs the first determination signal according to the determination result. In some embodiments, each frequency tolerance range is defined as the average frequency value corresponding to the frequency waveform which is chosen by the determination unit 44 plus an additional tolerance value (e.g., ±5%) when the in-ear earphone is worn in the first time. Certainly, if the information of the ear canal of different user is desired to be recorded, the first storage unit 46 can be employed to record again, and is not redundantly described hereinafter.

Moreover, the analysis unit 45 not only analyzes the wearing status of the in-ear earphone according to the first determination signal outputted by the determination unit 44, but also analyzes the wearing status of the in-ear earphone according to the other determination signal to achieve more precise determination result. In some embodiments, the processor 4 further includes a second operation unit 47 electrically connected between the filter 412 of the conversion unit 41 and the analysis unit 45 to receive the frequency domain signal S3 filtered and outputted by the filter 412. The second operation unit 47 includes a preset frequency interval. The frequency interval is located between a frequency upper limit value and a frequency lower limit value. For example, the frequency interval is located between 500 Hz and 8000 Hz, the frequency upper limit value is 500 Hz and the frequency lower limit value is 8000 Hz. The second operation unit 47 chooses the frequency waveform located in the frequency interval from the plurality of frequency waveforms of the frequency domain signal S3. For example, the second operation unit 47 chooses at least one frequency waveform having the center frequency value located in the frequency interval. That is, the second operation unit 47 chooses at least one frequency waveform from the plurality of frequency waveforms of the frequency domain signal S3 and each chosen frequency waveform has the center frequency value located between the frequency upper limit value and the frequency lower limit value. Consequently, the frequency waveform has higher frequency values or lower frequency values are removed, so that the whole value determination is not influenced by the extreme values. In this embodiment, the second operation unit 47 only chooses the frequency waveform having the center frequency value located between 500 Hz and 8000 Hz, i.e., the frequency waveforms from the fifth frequency waveform f5 to the ninth frequency waveform f9. Each frequency value of each frequency waveform which is chosen has a frequency gradient correspondingly. Namely, each frequency value of the frequency waveforms from the fifth frequency waveform f5 to the ninth frequency waveform f9 has a frequency gradient correspondingly. The frequency upper limit value, the frequency lower limit value and the frequency gradient of the second operation unit 47 of this embodiment is similar to the frequency upper limit value, the frequency lower limit value and the frequency gradient of the calculation unit 421, and is not redundantly described hereinafter.

The second operation 47 further includes a plurality of gradient comparison values. Each of the plurality of gradient comparison values has two kinds of type, i.e., positive type and negative type. When the gradient comparison value is the positive type, the slope of the frequency gradient is positive. When the gradient comparison value is the negative type, the slope of the frequency gradient is negative. Preferably but not exclusively, the number of the gradient comparison values is equal to the number of the frequency waveforms which are chosen. In this embodiment, the number of the gradient comparison values and the number of the frequency waveforms which are chosen are 5, respectively (i.e., the number of the frequency waveforms from the fifth frequency waveform f5 to the ninth frequency waveform f9). Each of the plurality of gradient comparison values is corresponding to one of the frequency waveforms which are chosen. The frequency domain signal S3 has different signal waveform according to different shape of the sealed cavity, so that every frequency value of each frequency waveform which is chosen has different frequency gradient correspondingly according to the different signal waveform caused by different shape of the sealed cavity. Moreover, the gradient differences between two frequency gradients corresponding to any two frequency values of each frequency waveform of the frequency domain signal S3 which is chosen are different probably. The second operation unit 47 calculates and sets a gradient difference according to the two frequency values of each chosen frequency waveform of the frequency domain signal S3 and the two gains corresponding to two frequency values.

In this embodiment, each gradient difference is defined as the slope type corresponding to the gain with the greater frequency value subtracted to the gain with the less frequency value of the two frequency values of the corresponding frequency waveform. As shown in FIG. 3, for example, the point B and the point C are located in the sixth frequency waveform. The frequency value of the point B is 900 Hz, and the gain of the point B is 105 dB. The frequency value of the point C is 1000 Hz, and the gain of the point C is 107 dB. The gradient difference between the point B and the point C is the slope type between the gain (i.e., 107 dB) with the greater frequency value (i.e., 1000 Hz) and the gain (i.e., 105 dB) with the less frequency value (i.e., 900 Hz). That means the slope type corresponding to the gain with the greater frequency value subtracted to the gain with the less frequency value, i.e., 107 dB−105 dB=+2 dB. Consequently, the gradient difference between the point B and the point C is positive type. Similarly, when the gain with the greater frequency value subtracted to the gain with the less frequency value is negative value, the gradient difference is negative type.

The second operation unit 47 compares the gradient difference of each chosen frequency waveform with the corresponding gradient comparison value and obtains a comparison result. For example, the second operation unit 47 compares whether the slope type represented as the gradient difference of each chosen frequency waveform is the same with the slope type of the corresponding gradient comparison value. The second operation unit 47 outputs a second determination signal according to the determination result. For example, when the determination result shows that each gradient difference is the same with the corresponding gradient comparison value, the second determination signal is served as a third voltage level. When the determination result shows that any one of the gradient differences is different to the corresponding gradient comparison value, the second determination signal is served as a fourth voltage level.

In this embodiment, the analysis unit 45 is electrically connected with the determination unit 44 and the second operation unit 47. The analysis unit 45 transmits signals to and receives signals from the mobile device 5 by means of wireless transmission. The analysis unit 45 receives the first determination signal outputted by the determination unit 44 and the second determination signal outputted by the second operation unit 47, and analyzes the wearing status of the in-ear earphone according to the first determination signal and the second determination signal. For example, in case that the first determination signal is served as the first voltage level (i.e., the determination result represented by the first determination signal is that the average frequency value of every chosen frequency waveform is located in the corresponding frequency tolerance range, respectively) and the second determination signal is served as the third voltage level (i.e., the determination result represented by the second determination signal is that each gradient difference is the same with the corresponding gradient comparison value), the analysis unit 45 analyzes that the wearing status of the in-ear earphone is normal. That indicates the in-ear earphone is worn by the same user and the wearing status of the in-ear earphone worn by the user is correct. When the first determination signal is served as the second voltage level (i.e., the determination result represented by the first determination signal is that the average frequency value of any frequency waveform which is chosen is not located in the corresponding frequency tolerance range) or the second determination signal is served as the fourth voltage level (i.e., the determination result represented by the second determination signal is that any one of the gradient differences is different to the corresponding gradient comparison value), the analysis unit 45 analyzes that the wearing status of the in-ear earphone is abnormal. That indicates that the in-ear earphone is worn by the different user or the same user wears the in-ear earphone in incorrect wearing status.

In some embodiments, when the in-ear phone is worn in the first time by the user, the detection system 1 records the information of the ear canal of the user first. When the in-ear earphone is worn again, the detection system 1 determines whether the in-ear earphone is worn correctly or determines whether the in-ear earphone is worn by the same user. For recording the information of the ear canal of the user, the processor 4 of the detection system 1 further includes a second storage unit 48 electrically connected with the second operation unit 47. When the in-ear phone is worn in the first time by the user, the second storage unit 48 receives the gradient difference set by the second operation unit 47. The second storage unit 48 sets the plurality of gradient comparison values utilized by the second operation unit 47 according to the corresponding gradient difference of each frequency waveform which is chosen. The plurality of gradient comparison value information are stored in the second storage unit 48. When the in-ear earphone is worn in not first time by the user, the second storage unit 48 transmits the gradient comparison value information to the second operation unit 47, so that the second operation unit 47 receives the gradient comparison value information and determines whether the gradient difference of each frequency waveform which is chosen is equal to the corresponding gradient comparison value, and outputs the second determination signal according to the determination result.

Figure 4:
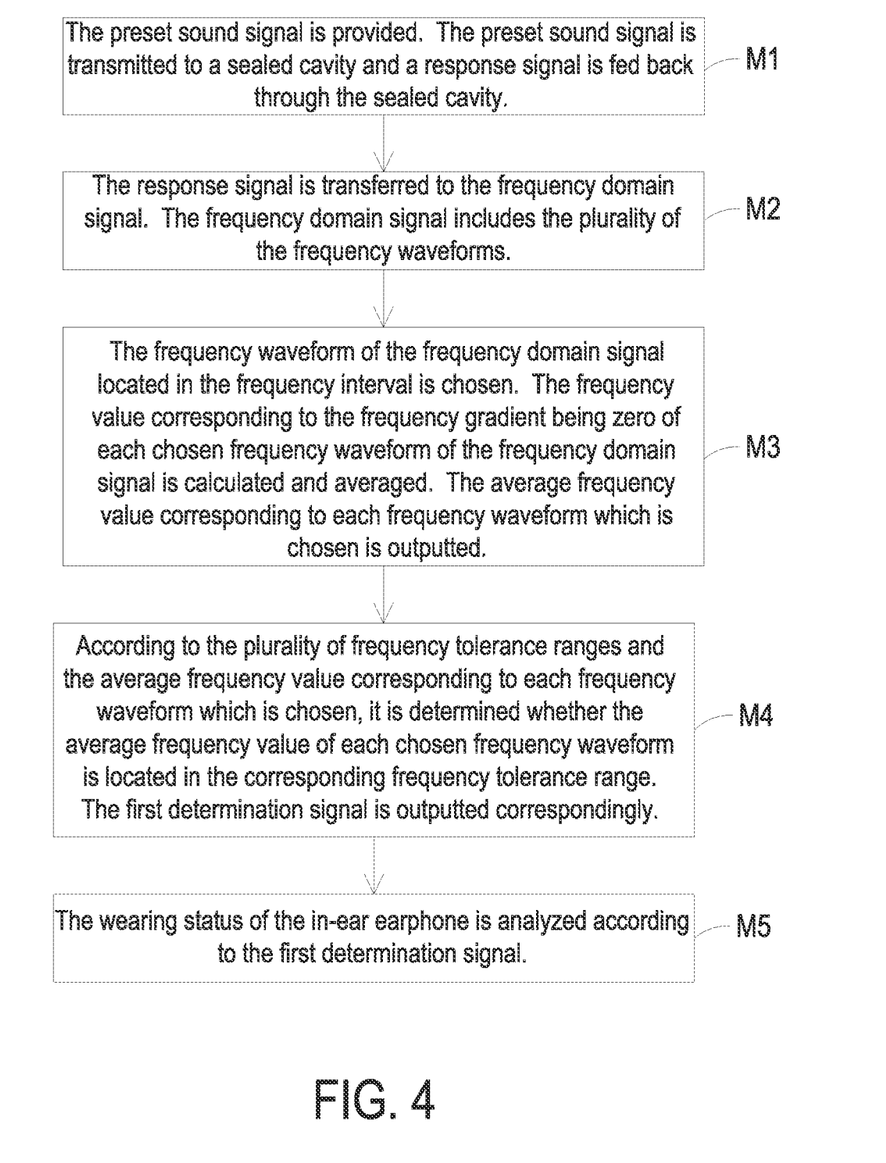
FIG. 4 is a flowchart illustrating a detection method for the detection system according to a first embodiment of the present disclosure.

FIG. 4 is a flowchart illustrating a detection method for the detection system according to a first embodiment of the present disclosure. The detection method of the detection system 1 of the present disclosure is shown in FIG. 4. Firstly, a step M1 is performed. In the step M1, the preset sound signal S1 is provided. The preset sound signal S1 is transmitted to a sealed cavity and a response signal S2 is fed back through the sealed cavity. Then, a step M2 is performed. In the step M2, the response signal S2 is transferred to the frequency domain signal S3. The frequency domain signal S3 includes the plurality of frequency waveforms. Then, a step M3 is performed. In the step M3, the frequency waveform of the frequency domain signal S3 located in the frequency interval is chosen. The frequency value corresponding to the frequency gradient being zero of each chosen frequency waveform of the frequency domain signal S3 is calculated and averaged. The average frequency value corresponding to each frequency waveform which is chosen is outputted. Then, a step M4 is performed. In the step M4, according to the plurality of frequency tolerance ranges and the average frequency value corresponding to each frequency waveform which is chosen, it is determined whether the average frequency value of each chosen frequency waveform is located in the corresponding frequency tolerance range. The first determination signal is outputted correspondingly. Then, a step M5 is performed. In the step M5, the wearing status of the in-ear earphone is analyzed according to the first determination signal.

Figure 5:
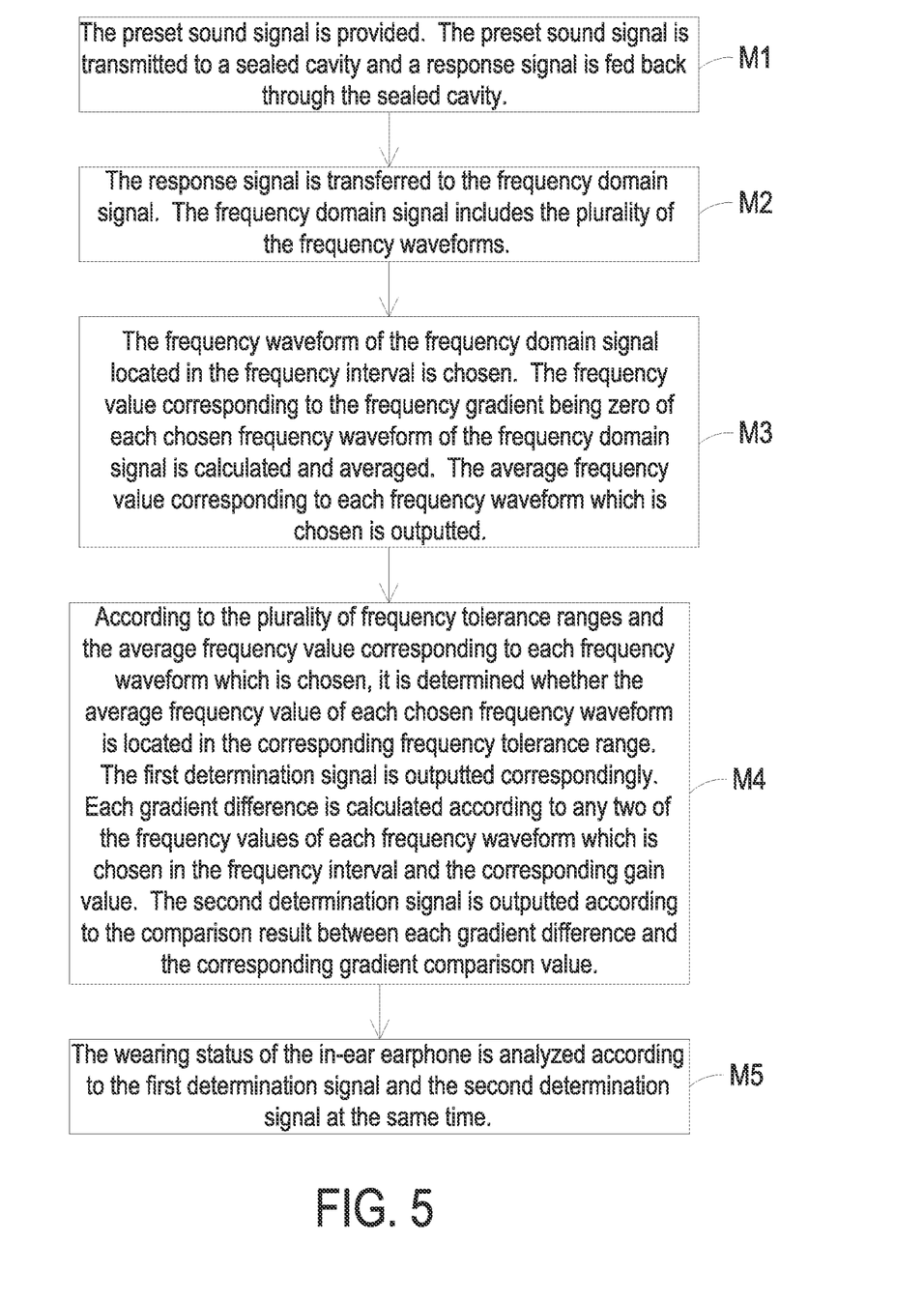
FIG. 5 is a flowchart illustrating a detection method for the detection system according to a second embodiment of the present disclosure.

FIG. 5 is a flowchart illustrating a detection method for the detection system according to a second embodiment of the present disclosure. Compared to the detection method of the first embodiment of FIG. 4, the step M4 of the detection method of this embodiment further includes the following step. Each gradient difference is calculated according to any two of the frequency values of each frequency waveform which is chosen in the frequency interval and the corresponding gain value. The second determination signal is outputted according to the comparison result between each gradient difference and the corresponding gradient comparison value. Moreover, the step M5 of this embodiment further includes the following step. The wearing status of the in-ear earphone is analyzed according to the second determination signal. That means the wearing status of the in-ear earphone is analyzed according to the first determination signal and the second determination signal at the same time.

From the above descriptions, the microphone of the detection system of the present invention receives the response signal formed according to the shape of the sealed cavity. The conversion unit transfers the response signal in the time domain to the frequency domain signal in the frequency domain. The calculation unit obtains every frequency value corresponding to the frequency gradient being zero of each frequency waveform which is chosen of the response signal. The average unit averages every frequency value corresponding to the frequency gradient being zero of each chosen frequency waveform into the average frequency value and outputs the average frequency value. The determination unit determines whether the average frequency value is located in the corresponding frequency tolerance range, so that the wearing status of the in-ear earphone is confirmed. The detection system of the present disclosed applied to the in-ear earphone utilizes the characteristics of the different response signal produced by the ear canal of the different user and analyzes the response signal, so that the wearing status of the in-ear earphone is detected efficiently. Even in case that the in-ear earphone is worn for a long time, the detection system of the present disclosure detects the wearing status of the user continuously. The efficacy of the detection system of the present disclosure applied to the in-ear earphone is maintained at optimal status continuously. Moreover, the detection system of the present disclosure determines whether the same user uses the in-ear earphone at the same time.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A detection system applied to an in-ear earphone, the in-ear earphone wearing in an ear canal of a user, a space between the in-ear earphone and the ear canal being closed and forming a sealed cavity, and the detection system comprising:
    a sound unit transmitting a preset sound signal to the sealed cavity, so that a response signal is fed back from the sealed cavity;
    a microphone configured to receive the response signal; and
    a processor comprising:
        a conversion unit electrically connected with the microphone and configured to receive the response signal and transfer the response signal to a frequency domain signal, and the frequency domain signal includes a plurality of frequency waveforms;
        a first operation unit electrically connected with the conversion unit and configured to receive the frequency domain signal, wherein the first operation unit chooses at least one of the plurality of frequency waveforms of the frequency domain signal located in a frequency interval, calculates and averages every frequency value corresponding to a frequency gradient being zero of each of the plurality of frequency waveforms which is chosen, and outputs an average frequency value corresponding to each of the plurality of frequency waveforms which is chosen;
        a determination unit electrically connected with the first operation unit and configured to receive a plurality of frequency tolerance ranges and the average frequency value corresponding to each of the plurality of frequency waveforms which is chosen, wherein the determination unit determines whether the average frequency value corresponding to each of the plurality of frequency waveforms which is chosen is located in corresponding one of the plurality of frequency tolerance ranges and outputs a first determination signal; and
        an analysis unit electrically connected with the determination unit and analyzing a wearing status of the in-ear earphone according to the first determination signal.

2. The detection system according to claim 1, wherein the frequency gradient is defined as a tangent slope between a gain and the frequency value.

3. The detection system according to claim 1, wherein when the average frequency value is located in corresponding one of the plurality of frequency tolerance ranges, the first determination signal is served as a first voltage level, and the analysis unit analyzes that the wearing status of the in-ear earphone is normal according to the first determination signal.

4. The detection system according to claim 1, wherein when any one of the average frequency values is not located in corresponding one of the plurality of frequency tolerance ranges, the first determination signal is served as a second voltage level, and the analysis unit analyzes that the wearing status of the in-ear earphone is abnormal according to the first determination signal.

5. The detection system according to claim 1, wherein the processor further comprises a first storage unit electrically connected with the determination unit, wherein the plurality of frequency tolerance ranges are stored in the first storage unit.

6. The detection system according to claim 1, wherein when the in-ear earphone is worn in first time, the determination unit receives each of the average frequency values and sets the plurality of frequency tolerance ranges according to the corresponding average frequency values.

7. The detection system according to claim 1, wherein the processor comprises a second operation unit electrically connected between the conversion unit and the analysis unit, the second operation unit comprises a plurality of gradient comparison values, the second operation unit calculates a gradient difference according to any two frequency values of each of the plurality of frequency waveforms which is chosen in the frequency interval and two gains corresponding to the two frequency values.

8. The detection system according to claim 7, wherein the second operation unit outputs a second determination signal to the analysis unit according to a comparison result between the gradient difference and corresponding one of the plurality of gradient comparison values, and the analysis unit analyzes the wearing status of the in-ear earphone according to the first determination signal and the second determination signal.

9. The detection system according to claim 8, wherein when any one of the average frequency values is not located in corresponding one of the plurality of frequency tolerance ranges or the gradient difference is different to the corresponding one of the plurality of gradient comparison values, the analysis unit analyzes the wearing status of the in-ear earphone is abnormal.

10. The detection system according to claim 7, wherein the processor further comprises a second storage unit electrically connected with the second operation unit, wherein when the in-ear earphone is worn in first time, the second storage unit receives each of the gradient differences set by the second operation unit, the plurality of gradient comparison values utilized by the second operation unit are set according to each of the gradient differences, and information of the plurality of gradient comparison values is stored in the second storage unit.

11. The detection system according to claim 1, wherein the frequency interval is located between a frequency upper limit value and a frequency lower limit value, wherein each of the plurality of frequency waveforms comprises a center frequency value.

12. The detection system according to claim 1, wherein the first operation unit further comprises a calculation unit and an average unit.

13. A detection method applied to a detection system of an in-ear earphone, the in-ear earphone wearing in an ear canal of a user, a space between the in-ear earphone and the ear canal being closed and forming a sealed cavity, and the detection method comprising:

(a) providing a preset sound signal, and transmitting the preset sound signal to the sealed cavity and a response signal being fed back through the sealed cavity;

(b) transferring the response signal to a frequency domain signal, wherein the frequency domain signal includes a plurality of frequency waveforms;

(c) choosing at least one of the plurality of frequency waveforms located in a frequency interval, calculating and averaging every frequency value corresponding to a frequency gradient being zero of each of the plurality of frequency waveforms which is chosen, and outputting an average frequency value corresponding to each of the plurality of frequency waveforms which is chosen;

(d) determining whether the average frequency value corresponding to each of the plurality of frequency waveforms which is chosen is located in corresponding one of the plurality of frequency tolerance ranges, and outputting a first determination signal; and (e) analyzing a wearing status of the in-ear earphone according to the first determination signal.

14. The detection method according to claim 13, wherein in the step (d), when the average frequency value is located in corresponding one of the plurality of frequency tolerance ranges, the first determination signal is served as a first voltage level, wherein in the step (e), the wearing status of the in-ear earphone is analyzed as normal according to the first determination signal.

15. The detection method according to claim 13, wherein in the step (d), when any one of the average frequency values is not located in corresponding one of the plurality of frequency tolerance ranges, the first determination signal is served as a second voltage level, wherein in the step (e), the wearing status of the in-ear earphone is analyzed as abnormal according to the first determination signal.

16. The detection method according to claim 13, wherein the step (d) further comprises step of: calculating a gradient difference according to any two frequency values of each of the plurality of frequency waveforms which is chosen in the frequency interval and two gains corresponding to the two frequency values, and outputting a second determination signal according to a comparison result between the gradient difference and corresponding one of the plurality of gradient comparison values, wherein the step (e) further comprises step of analyzing the wearing status of the in-ear earphone according to the second determination signal.

17. The detection method according to claim 16, wherein in the step (d), when any one of the average frequency values is not located in corresponding one of the plurality of frequency tolerance ranges and the first determination signal is outputted, or any one of the gradient differences is different to the corresponding one of the plurality of gradient comparison values and the second determination signal is outputted, in the step (e), the wearing status of the in-ear earphone is analyzed as abnormal by an analysis unit.

* * * * *